United States Patent [19]
Prasad et al.

[11] Patent Number: 4,881,953
[45] Date of Patent: Nov. 21, 1989

[54] PREVENTION OF MEMBRANE DEGRADATION

[75] Inventors: Ravi Prasad, East Amherst; Oscar W. Haas, North Tonawanda, both of N.Y.

[73] Assignee: Union Carbide Corporation, Danbury, Conn.

[21] Appl. No.: 244,419

[22] Filed: Sep. 15, 1988

[51] Int. Cl.$^4$ ..................... B01D 53/22; B01D 53/04
[52] U.S. Cl. .......................... 55/16; 55/23; 55/74; 55/75; 55/158; 55/267; 55/387; 55/389
[58] Field of Search ................ 55/16, 23, 31, 33, 35, 55/74, 75, 158, 179, 267–269, 387, 389

[56] References Cited

U.S. PATENT DOCUMENTS

| | | | |
|---|---|---|---|
| 3,076,301 | 2/1963 | Roof | 55/18 |
| 3,324,626 | 6/1967 | Dresser et al. | 55/16 |
| 3,336,730 | 8/1967 | McBride et al. | 55/16 |
| 3,755,989 | 9/1973 | Fornoff et al. | 55/72 |
| 3,930,813 | 1/1976 | Gessner | 55/16 |
| 3,989,478 | 11/1976 | Jones | 55/23 X |
| 4,054,429 | 10/1977 | Ostojic et al. | 55/48 |
| 4,229,188 | 10/1980 | Intille | 55/16 |
| 4,231,768 | 11/1980 | Seibert et al. | 55/179 |
| 4,323,372 | 4/1982 | Bentz et al. | 55/59 |
| 4,324,565 | 4/1982 | Benkmann | 55/23 |
| 4,439,213 | 3/1984 | Frey et al. | 55/179 X |
| 4,448,757 | 5/1984 | Barnwell et al. | 55/23 X |
| 4,659,343 | 4/1987 | Kelly | 55/16 |
| 4,681,612 | 7/1987 | O'Brien et al. | 55/16 X |
| 4,787,919 | 11/1988 | Campbell et al. | 55/16 |

FOREIGN PATENT DOCUMENTS

| | | | |
|---|---|---|---|
| 59-156414 | 9/1984 | Japan | 55/16 |
| 61-230715 | 10/1986 | Japan | 55/16 |
| 2183499 | 6/1987 | United Kingdom | 55/16 |

Primary Examiner—Robert Spitzer
Attorney, Agent, or Firm—Alvin H. Fritschler

[57] ABSTRACT

In the separation of gases in a membrane system, degradation of membrane permeability is prevented by passing the feed gas mixture through a bed of adsorbent material, preferably activated carbon, to adsorb the heavier hydrocarbon contaminants responsible for degradation without removal of lighter hydrocarbons.

32 Claims, 1 Drawing Sheet

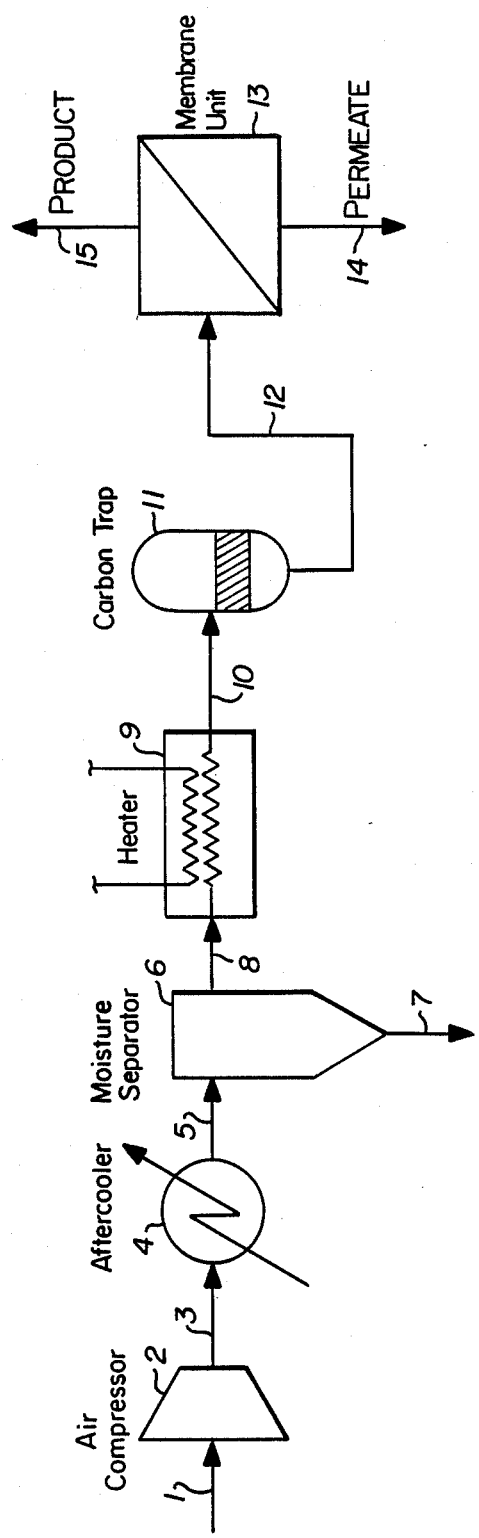

PREVENTION OF MEMBRANE DEGRADATION

BACKGROUND OF THE INVENTION

1. Field of the Invention

The invention relates to permeable membranes. More particularly, it relates to the preventing of the degradation of the permeation characteristics of permeable membranes employed in as separation operations.

2. Description of the Prior Art

Permeable membrane processes and systems are known in the art and have been employed or considered for a wide variety of gas and liquid separations. In such operations, a feed stream is brought into contact with the surface of a membrane, and the more readily permeable component of the feed stream is recovered as a permeate stream, with the less readily permeable component being withdrawn from the membrane system as a non-permeate stream.

The inherent simplicity of such fluid separation operations constitutes an incentive in the art to expand the use of membrane systems in practical commercial operations. In this regard, it will be appreciated that the selectivity and permeability characteristics of such membrane systems must be compatible with the overall production requirements of a given application. It is also necessary, of course, that the membranes exhibit acceptable stability and do not suffer undue degradation of their performance properties in the course of practical commercial operations.

Air separation applications constitute a highly desirable field of use for permeable membranes. In such applications, oxygen is typically the more readily permeable component of the feed air for particular membranes, and is withdrawn as the permeate gas. In such embodiments, nitrogen is the less readily permeable component, and is recovered as non-permeate gas. In air separation applications, it has been found that the performance characteristics of the membranes are sensitive to the presence of certain contaminants in the feed air stream. Exposure to such contaminants may result in a significant reduction in the permeability of the membrane in use. Fortunately, most contaminants commonly present in ambient air, such as light hydrocarbons, $H_2O$ and $CO_2$, have been found to result in, at most, a modest decrease in membrane permeability. The presence of even relatively low concentrations, e.g., less than 1 ppm by volume as $C_1$, of heavy hydrocarbon oil vapors, such as might enter the feed air stream from an oil lubricated air compressor, can result in rapid and extensive loss of membrane permeability.

Among the major cost components of membrane systems for air or other gas separations are the membrane modules having a given membrane surface area and the air or other gas compressor unit to achieve a suitable permeation pressure level, so that the desired product gas quality and production can be achieved. The surface area requirements of the membrane system can generally be minimized for a given set of operating conditions, i.e., pressure, temperature and flow rate, by selecting a membrane material having a very high permeability for the more readily permeable component of the gas mixture being separated. Typically, for a given selectivity, the higher the membrane permeability, the less membrane area will be required for a given set of production requirements. Compressor costs are typically minimized, particularly in small plants, by the selection of oil lubricated rotary screw feed compressors.

During development work on membrane systems for air separation applications, it was found that the membrane permeability was subject to an initially rapid and significant decrease, followed by a further gradual decline over a period of months of operation. In response to such undesirable decrease in membrane permeability, it is presently common membrane practice to size the active membrane surface area with a safety factor sufficiently large to compensate for the anticipated permeability loss from all sources. Initially, therefore, the membrane system is significantly oversized for the desired product flow, and the feed gas compressor is typically operated in a turndown mode. As permeability degradation proceeds, either the operating temperature or pressure, or both, are increased to compensate for the decrease in permeability. In some instances, it is necessary or desirable to by-pass some of the modules in the membrane system initially, so as to reduce excess membrane area employed when the membranes exhibit their full permeability capability, and subsequently to bring such by-passed modules on stream as degradation of the initially employed modules progresses. In such instances, it will be appreciated that, in addition to a significant capital cost penalty associated with the provision of extra membrane surface area, such a membrane system must operate over a significant portion of its operating life under off design conditions, and that the control strategy for such a membrane system is more complex than for a system operating closer to its optimum design conditions.

As an alternative to such overdesign of membrane systems to compensate for degradation in use, attempts have been made to restore lost performance, but such efforts were initially unsuccessful in developing an economically feasible means for restoring the permeability of degraded membranes. While practical and economical means for restoring the permeability characteristics of degraded membranes may presently be available, obviating the need to discard degraded modules for replacement by new modules after an unduly short period of operation, further improvement in the response to the problem of membrane degradation is highly desirable in the membrane art. Neither overdesign of the membrane system nor interruption of gas product operations for membrane restoration treatment, or a combination of these approaches is an entirely satisfactory means for overcoming permeability degradation in practical commercial air or other gas separation operations.

It is an object of the invention, therefore, to provide an improved membrane system and process for overcoming the problem of degradation of permeability during gas production operations.

It is another object of the invention to provide a membrane system and process obviating the need for significant overdesign or for premature replacement of degraded membrane modules.

It is a further object of the invention to provide a membrane system and process for maintaining membrane permeability and minimizing the need for the interruption of gas producing operations for the treatment of membrane modules for restoration of the permeability characteristics thereof.

With these and other objects in mind, the invention is hereinafter described in detail, the novel features thereof being particularly pointed out in the appended claims.

SUMMARY OF THE INVENTION

The system and process of the invention employs an adsorbent trap to reduce or eliminate membrane degradation due to heavy oil hydrocarbon vapor contamination. By adsorbing such heavy hydrocarbons from the feed gas, the adsorbent trap enables membrane systems to be employed without significant overdesign of separation capacity and with extended periods of effective life before replacement or restoration treatment.

BRIEF DESCRIPTION OF THE DRAWING

The invention is hereinafter described with reference to the accompanying drawing which is a schematic drawing of a membrane separation system adapted for the use of an adsorbent trap for the removal of heavy oil hydrocarbon vapors from a feed gas stream prior to passage to the membrane unit itself.

DETAILED DESCRIPTION OF THE INVENTION

The objects of the invention are accomplished by using an adsorbent trap to preserve membrane permeability performance from degradation by heavy oil hydrocarbon vapors present in the feed gas stream passing to the membrane unit. The adsorbent trap thus adsorbs the heavy oil hydrocarbon vapors that are found to be principally responsible for the significant loss of permeability that rapidly occurs upon initial use of a membrane in gas separation operations.

The adsorbent trap not only effectively traps the heavy oil hydrocarbon vapors primarily responsible for membrane degradation, but it also allows lighter, less strongly adsorbed, hydrocarbon vapors to pass through said adsorbent trap to the membrane fibers themselves during continued practice of the invention. This is an important feature, as it enables the adsorbent trap to be designed and operated so as to significantly retard, or even effectively prevent, the rate of membrane permeability loss due to heavy oil hydrocarbon vapors while being of an acceptably small, economically feasible size. This advantageous combination of effectiveness and size is made possible by the surprising discovery, referred to above, that light hydrocarbons, carbon dioxide, and water, the contaminants most commonly found in ambient air, do not contribute appreciably to membrane degradation. Such light hydrocarbons are those less than, or equal to, $C_5$ hydrocarbons, with heavy oil hydrocarbon vapors being those greater than pentane ($C_5$).

The bed size of the adsorbent trap of the invention will be determined by the expected heavy oil hydrocarbon loading of the adsorbent material and the contaminant level of the feed gas stream being treated. If a single bed unit is employed, the quantity of adsorbent employed will also be a factor in determining the bed life of the adsorbent trap. If the quantity of adsorbent is excessive, the adsorbent vessel cost and the feed gas pressure drop across the vessel will be unnecessarily high. Higher feed compressor power consumption costs would necessarily result from such an unduly high pressure drop. If, on the other hand, the adsorbent bed is too small, premature breakthrough of heavy oil hydrocarbon vapors from the carbon trap, and loss of effective membrane performance, would occur. In general, a design adsorbent trap bed life of from 3 to 12 months, preferably about 6 months, provides a reasonable balance of bed size and adsorbent life for a disposable adsorbent trap.

It should be noted that, upon initial use of clean or fresh adsorbent material, said adsorbent will not only absorb heavy oil hydrocarbon vapors from the feed gas, but will also adsorb light hydrocarbons, carbon dioxide and water as well, depending upon the properties of the particular adsorbent material employed. During continued passage of the feed gas through the adsorbent bed, however, the selective adsorption of additional quantities of said heavy oil hydrocarbon vapors therefrom in the adsorbent trap will result in the displacement of said light hydrocarbons, carbon dioxide and/or water from the adsorbent material and the passage thereof from the adsorbent trap with the feed gas passing to the membrane unit. As the adsorbent material employed in the practice of the invention is selective for the removal of said heavy oil hydrocarbon vapors in this manner, thus allowing light hydrocarbons, carbon dioxide and water to pass through, the size and cost of the carbon trap can be sufficiently small so that disposable use of the adsorbent in an in-line trap is feasible and generally preferred because of its simplicity. In other embodiments, however, a multi-bed regenerative type system can be employed, with one bed being used for the desired heavy oil hydrocarbon vapor removal, while another bed is being regenerated by heating or other means for the desorption of adsorbed material from the surface of the adsorbent material.

With reference to the embodiment illustrated in the drawing for preventing undue membrane degradation, a feed stream in line 1 is passed to feed compressor 2 for pressurization to a desired membrane pressure level. The pressurized feed is passed in line 3 to aftercooler 4 of conventional nature for cooling to below the design operating temperature level of the membrane system. Upon cooling, the feed gas will typically be supersaturated, i.e., it will be saturated with condensable vapor constituents and also contain free liquid droplets. The feed gas will thus typically comprise compressed gas at below design operating temperature and liquid droplets. The cooled feed gas is passed in line 5 to conventional liquid separator zone 6, of any desired type, for removal of liquid droplets, e.g., water droplets from feed air, present in the feed gas through line 7. The thus-treated feed gas is removed from separator zone 6 through line 8. At this point, the compressed, cooled feed stream is typically saturated with said condensable vapor constituents thereof at the particular operating pressure employed. For example, if the feed gas is air, the treated gas stream comprises feed air saturated with water vapor.

In order to minimize or eliminate condensation on the gas separation surface of the membrane system, the feed gas can, as in the illustrated embodiment, be passed to heater 9 for superheating to a temperature above the saturation temperature of the feed gas at the applicable feed gas pressure. Steam or electrical heaters can conveniently be employed in such embodiments of the invention. From heater 9, the feed gas is passed through line 10 to adsorbent trap 11, in which the heavy oil hydrocarbon vapors are selectively adsorbed from the feed gas. During continuous operations, lighter hydrocarbons are not adsorbed from the feed gas in said adsorbent trap 11, which is illustrated as a single, in-line vessel that would contain a disposable quantity of adsorbent material.

From adsorbent trap 11, the feed gas, essentially free of the heavy oil hydrocarbon vapors harmful to the surface of the membrane, but containing the lighter, relatively harmless hydrocarbons, is passed in line 12 to membrane system 13 for the desired separation of the feed gas into a more readily permeable component stream and a less readily permeable component stream. The more permeable component is recovered as permeate stream 14, while the less permeable component is recovered as non permeate stream 15. For air separation, the desired high purity nitrogen product will generally be recovered as said non-permeate stream 15, while oxygen enriched air is recovered as permeate stream 14.

In highly preferred embodiments of the invention, the adsorbent employed is a carbon adsorbent. The carbon adsorbent thus preferably employed in a carbon trap for purposes of the invention can be any suitable, commercially available activated carbon material capable of effectively and selectively adsorbing said heavier oil hydrocarbon vapors, while allowing lighter hydrocarbon vapors to remain with the feed gas passing through said carbon trap to the membrane system. Representative examples of typical, commercially available activated carbon materials that can be conveniently employed as the carbon adsorbent of the invention are Calgon PCB Carbon and BPL vapor phase carbon; Carbon 207C of Sutcliffe-Speakman, Inc.; Westvaco Nuchar WV-3; and Norit RB3 of American Norit. It is also within the scope of the invention to employ other adsorbent materials to selectively adsorb the heavy oil hydrocarbon vapors from the feed gas while allowing lighter hydrocarbons to pass with the feed gas mixture to the membrane system. A variety of commercially available zeolite molecular sieve materials, such as the well known 5A and 13X molecular sieves, can be employed for such purpose. Other adsorbent materials, such as alumina, can also be employed in the practice of the invention.

Activated carbon adsorbents are preferred over zeolite molecular sieve materials for the purposes of the invention both because of the typical wide pore size distribution of the carbon, which admits larger hydrocarbon molecules for entrapment therein, and because of its ability to retain its adsorptive capacity in the presence of fairly high moisture levels. Thus, carbon adsorbents are less sensitive to moisture adsorption than zeolite molecular sieves. In addition, the moisture adsorbed by zeolite molecular sieves is found to be difficult to desorb and remove from the adsorbent trap in the course of the continuous passage of feed gas thereto. While light hydrocarbons initially adsorbed along with heavier hydrocarbons upon the passage of a feed gas mixture to a fresh zeolite molecular sieve adsorbent trap are displaced upon the continued adsorption of heavier hydrocarbons from additional quantities of said feed gas, water adsorbed in the zeolite molecular sieve material is not readily displaced therefrom. As a result, the adsorptive capacity of the zeolite bed tends to be reduced in a manner not encountered upon the preferred use of carbon adsorbent.

The carbon bed in the preferred carbon trap of the invention, or other adsorbent trap, preferably should be sized to product at least about 6 months of protection of the membrane from degradation, yet have a bed depth that results in less than 5 psi pressure drop in the feed air or other feed stream. Illustrative design features of a typical air separation application of the invention are (1) a feed flow of 66,000 SCFH, (2) a feed gas pressure of 150 psig, (3) an operating temperature of 90° F., and (4) hydrocarbon contaminant levels in the feed air stream of 1.5 ppm (volume) of $C_5$ or less hydrocarbon vapors, measured as $CH_4$, and of 0.5 ppm (volume) of greater than $C_5$, measured as methane.

Membrane separation systems typically employ oil-flooded screw compressors to supply pressurized feed air to the membrane separation surfaces. The resultant oil contamination of the feed air is found to degrade membrane performance as discussed above. Such oil-flooded compressors may, of course, be employed for other feed gas pressurization application, and other forms of oil lubricated compressors may be employed for feed air or other feed gas pressurization prior to membrane separation. In all such applications, hydrocarbon oil vapors can enter the feed gas stream being passed to the membrane system. As even very low concentrations of heavy oil hydrocarbon vapors, i.e., less than 1 ppmv ($C_1$) can result in rapid and extensive loss of membrane permeability, the ability of the carbon or other adsorbent trap to selectively remove such heavy hydrocarbons from the feed gas, while allowing the lighter hydrocarbons not harmful to the membrane material to pass with the feed gas to the membrane system, enables membrane degradation to be controlled and prevented in a convenient, economically feasible manner. Those skilled in the art will appreciate that, apart from such harmful contamination resulting from the means for cooling and removing liquid droplets from use of oil-flooded or other oil lubricated feed gas compressors, other sources of such feed gas contamination exist, and the degradation of membranes thereby can be prevented by the practice of the invention. Thus, the feed air or other gas to be separated may pertain to a ship board application nearby to a diesel engine atmosphere. Similarly, an air or other separation application may be in the vicinity of a hydrocarbon refinery operation. In such cases or other analogous applications, it is possible for the feed gas to become contaminated with heavy hydrocarbons sufficient to cause commercially undesirable rates of membrane deterioration. In all such cases, the invention provides a convenient and practical approach to the prevention of such deterioration so as to avoid the necessity for employing additional membrane surface area to produce a given product flow and purity.

The carbon trap or other adsorbent vessel of the invention, conveniently placed between the feed compressor and the membrane modules, will typically be designed with a superficial velocity (based on actual gas flowrate) in the range of from about 0.2 to about 2.0 ft./sec., preferably about 0.75 ft./sec. A downward gas flow direction in the adsorbent vessel is preferred to allow the use of small particle sizes without regard to fluidization limitations. Small size activated carbon particles, e.g., less than 6 mesh, such as between 6 and 20 mesh, are desirable in order to reduce the resistance to mass transfer and to ensure that the bulk of the high surface area activated carbon or other adsorbent is accessible to the heavy hydrocarbon molecules to be selectively removed from the feed gas stream. The relative humidity of the feed gas stream should desirably be kept low, for example, at or below 85% to prevent condensation from occurring in the adsorbent bed. A low relative humidity is also desirable for the membrane modules themselves, and a heater is commonly provided for this purpose, as in the illustrative drawing.

The invention will be understood to pertain to any desired membrane system capable of selectively permeating a more readily permeable component of a feed mixture containing said component and a less readily adsorbable component. Thus, membranes of the composite type, asymmetric type membranes or any other form of membrane structure can be advantageously protected from undue degradation by the practice of the invention. Composite membranes generally comprise a thin separation layer or coating of a suitable permeable membrane material superimposed on a porous substrate, with the separation layer determining the separation characteristics of the composite membrane structure. Asymmetric membranes, on the other hand, are composed essentially of a single permeable membrane material having a thin dense semipermeable skin that determines the separation characteristics of the membrane, and a less dense, porous, nonselective support region that serves to preclude the collapse of the thin skin region under pressure. Such membrane structures may be prepared in a variety of forms, such as spiral wound, hollow fiber, flat sheet and the like. For use in practical commercial operations, such membrane structures are commonly employed on membrane assemblies that are typically positioned within enclosures to form membrane modules that comprise the principal elements of an overall membrane system. A membrane system generally comprises a number of such modules, arranged for either parallel or series operation, and constructed as hollow fiber bundles, spiral wound cartridges, pleated flat sheet membrane assemblies or other such assemblies common in the membrane industry.

The membrane material employed in any particular gas separation can be any material capable of selectively permeating a more readily permeable component of the feed air or other feed gas mixture. Cellulose derivatives, such as cellulose acetate, cellulose acetate butyrate, and the like; polyamides and polyimides, including aryl polyamides and aryl polyimides; polysulfones; polystyrenes and the like, are representative examples of such materials. Apart from air separation applications as noted above, the purification of hydrogen from an off-gas containing methane, ethane and other hydrocarbons is an illustrative example of other gas separation applications that can be beneficial by the practice of the invention when the subject source of degradation is a problem encountered in practical commercial applications. The recovery of hydrogen from ammonia purge gas and carbon dioxide and methane separation are other such examples.

The presence of the preferred carbon trap of the invention, or other suitable adsorption trap, is found to be most important during start-up and initial operation of the membrane system, when the concentration of heavy oil hydrocarbon vapors in the feed gas stream are likely to be highest. Similarly, when the lubrication oil is changed during periodic compressor maintenance, it may be desirable to restart with a fresh carbon or other adsorbent bed.

In an embodiment of the invention operating under the typical conditions referred to above, it was determined that a 1.70 ft. bed diameter was desirable, with the bed having a depth of 2.35 ft. and containing 123 lbs. of carbon. It is estimated that the added capital cost for such a carbon trap would be roughly $2,500 and would necessitate additional operating costs of about $500 per year for carbon adsorbent and slightly higher power requirements than in a similar overall membrane separation system without said carbon trap. Based on the avoidance of an otherwise necessary 30% of additional membrane area to compensate for membrane degradation upon the use thereof for air separation with an oil flooded screw compressor to supply pressurized feed air for the operation, the additional costs associated with the use of a carbon trap can be recovered in less than 12 months of actual operation. In other applications in which the extent of membrane permeability loss is significantly reduced, and/or the rate of loss in slowed, the invention enables the membrane system to be more efficiently operated, with appreciable overall savings enhancing the feasibility of utilizing membrane systems for important air separation and other practical gas separation operations.

We claim:

1. In a process for the separation of a feed gas mixture in a membrane system capable of selectively permeating a more readily permeable component of said feed gas mixture containing said component and a less readily permeable component, in which said feed gas mixture contains contaminants comprising hydrocarbons heavier than $C_5$ (pentane) and lighter hydrocarbons of $C_5$ or less, the improvement consisting essentially of:
    (a) contacting the feed gas mixture containing said contaminants with a bed of adsorbent material prior to passage to said membrane system, the bed of adsorbent material serving to selectively adsorb the heavier hydrocarbons, with continued selective adsorption of said heavier hydrocarbons from additional quantities of said feed gas mixture resulting in the displacement of lighter hydrocarbons of $C_5$ or less initially adsorbed from the feed gas mixture by said bed, lighter hydrocarbons thus passing through the bed of adsorbent material with said feed gas mixture, the adsorbent bed size/life being determined by said selective adsorption of heavier hydrocarbons rather than the adsorption of both lighter and heavier hydrocarbon contaminants; and
    (b) passing said feed gas mixture, together with said lighter hydrocarbons, removed from the bed of adsorbent material to the membrane system for the selective permeation of the more readily permeable component of the feed gas mixture, the presence of said lighter hydrocarbons not resulting in appreciable degradation of the permeability of the membrane, whereby the significant degradation of membrane permeability otherwise caused by the presence of heavier hydrocarbons in the feed gas mixture is conveniently prevented, while the adsorbent material size/bed life are optimized for a given gas separation operation by the selective removal of only the heavier hydrocarbons detrimental to membrane permeability rather than the removal of both light and heavy hydrocarbons.

2. The process of claim 1 in which said bed of adsorbent material comprises a single bed, in-line adsorbent trap for said heavier hydrocarbons.

3. The process of claim 2 in which said adsorbent trap is a carbon trap containing a bed of activated carbon.

4. The process of claim 1 in which said bed of adsorbent material comprises a multi-bed system in which one bed is in use while another bed having completed its adsorptive bed life is being regenerated.

5. The process of claim 4 in which said multi-bed system comprises beds of activated carbon.

6. The process of claim 1 and including pressurizing the feed gas mixture in an oil lubricated compressor system prior to contact of the feed gas mixture with said bed of adsorbent material and said membrane system.

7. The process of claim 6 in which said compressor system comprises an oil-flooded screw compressor.

8. The process of claim 1 in which the feed gas mixture comprises feed air.

9. The process of claim 1 in which the feed gas mixture is contacted with said bed of adsorbent material and with said membrane system after pressurization of the feed base mixture.

10. The process of claim 9 in which said gas mixture is pressurized in an oil-lubricated compressor system.

11. The process of claim 10 and including cooling said pressurized feed gas mixture, and removing liquid droplets therefrom prior to contact with said bed of adsorbent material.

12. The process of claim 11 and including heating the feed gas mixture to superheat conditions following cooling and removal of liquid droplets therefrom and prior to contact with said bed of adsorbent material.

13. The process of claim 12 in which said adsorbent material is activated carbon.

14. The process of claim 1 in which said feed gas mixture is exposed to an atmosphere containing lighter and heavier hydrocarbon contaminants prior to passage to said bed of adsorbent material and to said membrane system.

15. The process of claim 1 in which said adsorbent material is activated carbon.

16. The process of claim 1 in which said adsorbent material is zeolite molecular sieve material.

17. The process of claim 1 in which said adsorbent material comprises alumina.

18. In a system in which a feed gas mixture is passed to a membrane system capable of selectively permeating a more readily permeable component of said feed gas mixture containing said component and a less readily permeable component in which said feed gas mixture contains contaminants comprising hydrocarbons heavier than $C_5$ (pentane) and lighter hydrocarbons of $C_5$ or less, the improvement consisting essentially of:

(a) a bed of adsorbent material for contact with said feed gas mixture prior to its passage to said membrane system, said bed of adsorbent material serving to selectively adsorb the heavier hydrocarbons from the feed gas mixture, with continued selective adsorption of said heavier hydrocarbons from additional quantities of said feed gas mixture resulting in the displacement of lighter hydrocarbons of $C_5$ or less initially adsorbed from the feed gas mixture by said bed, lighter hydrocarbons thus passing through the bed of adsorbent material with said feed gas mixture, the adsorbent bed size/life being determined by said selective adsorption of heavier hydrocarbons rather than the adsorption of both lighter and heavier hydrocarbon contaminants;

(b) means for passing the feed gas mixture containing contaminants comprising said heavier and lighter hydrocarbons to said bed of adsorbent material;

(c) said membrane system capable of selectively permeating a more readily permeable component from the feed gas mixture, the permeability characteristics of the membrane system not being appreciably degraded by the presence of said lighter hydrocarbons together with said feed gas mixture; and (d) means for passing said feed gas mixture, together with said lighter hydrocarbons, from said bed of adsorbent material to said membrane system, whereby the significant degradation of membrane permeability otherwise caused by the presence of heavier hydrocarbons in the feed gas mixture is conveniently prevented, while the adsorbent material size/bed life is optimized for a given gas separation operation by the selective removal of only the heavier hydrocarbons detrimental to membrane permeability rather than the removal of both light and heavy hydrocarbons.

19. The system of claim 18 in which said bed of adsorbent material comprises a single bed, in-line adsorbent trap for said heavier hydrocarbons.

20. The system of claim 19 in which said adsorbent trap is a carbon trap containing a bed of activated carbon.

21. The system of claim 20 in which the bed life of said bed of activated carbon is from about 3 to about 12 months.

22. The system of claim 21 in which said bed life is on the order of 6 months.

23. The system of claim 21 in which said single bed of activating carbon is disposable upon leading with heavier hydrocarbons.

24. The system of claim 21 and including heating means positioned to superheat said feed gas mixture after its passage through said cooling means and said liquid droplet removal means and before said feed gas mixture contacts said bed of activated carbon.

25. The system of claim 18 in which said bed of adsorbent material comprises a multi-bed system in which one bed is capable of being used while another bed having completed its adsorptive bed life undergoes regeneration.

26. The system of claim 25 in which said multi-bed system comprises beds of activated carbon.

27. The system of claim 18 and including (a) compressor means for pressurizing the feed gas mixture prior to contact with said bed of adsorbent material, and (b) means for passing said feed gas mixture from said compressor means to said bed of adsorbent material.

28. The system of claim 27 in which said compressor means comprises an oil-lubricated compressor system to which the feed gas mixture passes prior to contact with said bed of adsorbent material.

29. The system of claim 27 and including cooling mean sand liquid droplet removal means for cooling and removing liquid droplets from the compressed feed gas mixture during said passage from the compressor means to said bed of adsorbent material.

30. The system of claim 18 in which said adsorbent material is activated carbon.

31. The system of claim 18 in which said adsorbent material is zeolite molecular sieve material.

32. The system of claim 18 in which said adsorbent material comprises alumina.

* * * * *